B. F. STEWART.
CAR BRAKE.
No. 247,222. Patented Sept. 20, 1881.
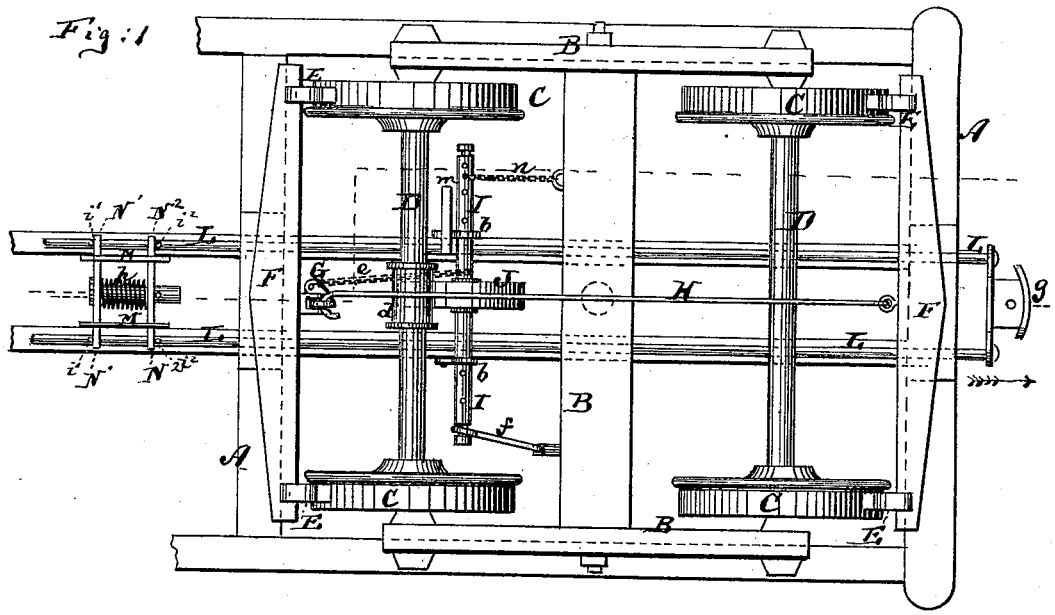
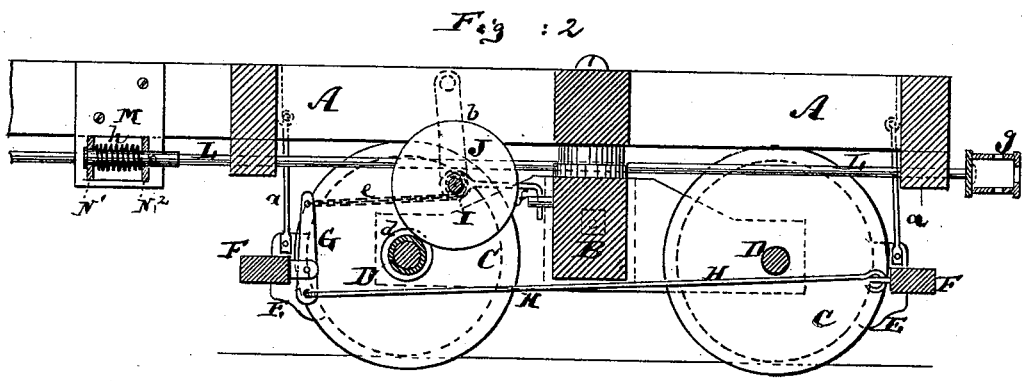
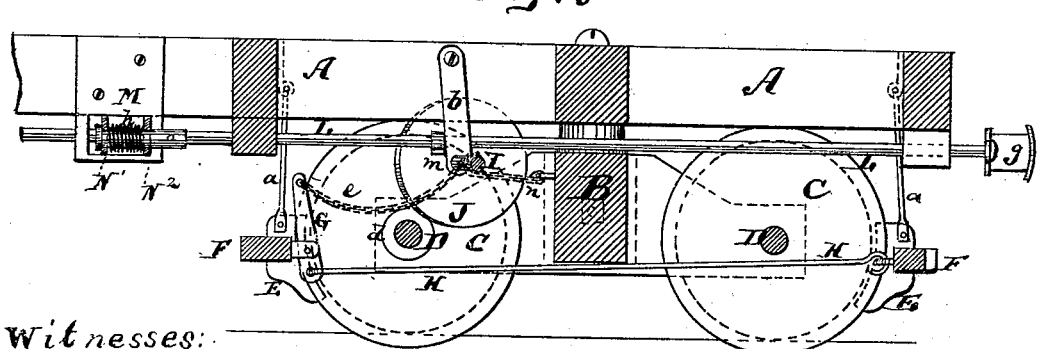
Witnesses:
John C. Tunbridge
Wm. H. C. Smith
Inventor:
Benjamin F. Stewart
by his attorney
A. v. Briesen

UNITED STATES PATENT OFFICE.

BENJAMIN F. STEWART, OF NEW PHILADELPHIA, OHIO, ASSIGNOR TO DAVID A. HOPKINS, OF PARK RIDGE, NEW JERSEY.

CAR-BRAKE.

SPECIFICATION forming part of Letters Patent No. 247,222, dated September 20, 1881.

Application filed May 26, 1879.

*To all whom it may concern:*

Be it known that I, BENJAMIN F. STEWART, of New Philadelphia, in the county of Tuscarawas and State of Ohio, have invented a new and Improved Brake for Railway-Cars, of which the following is a specification.

Figure 1 is a bottom view of a truck of a railway-car and part of the car-frame provided with my improved brake mechanism. Fig. 2 is a longitudinal vertical section of the same, showing the brakes applied. Fig. 3 is a similar section, showing the brakes off.

Similar letters of reference indicate corresponding parts in all the figures.

This invention relates to a new manner of utilizing a vibrating friction-wheel for the purpose of automatically applying the brakes to the wheels of railway-cars; and it consists more particularly in the new combination draw-bar having projecting top with a pivoted hanger and with the shaft having friction-wheel and chain, all parts being arranged so that the brakes will be automatically applied when the stop on the draw-bar is moved away from the hanger. This arrangement insures that when the car moves in the direction in which the draft is applied to it the brakes will be off, whereas, whenever the car moves in the direction contrary to that in which the draft-bar is moved, the brakes will immediately and automatically be applied.

In the accompanying drawings, the letter A represents the frame of the car.

B is the frame of one of the trucks of the car, hung and constructed in the usual manner.

C C are the wheels of the truck, mounted upon axles D D in the usual manner.

E E are the brake-shoes, connected to brake-bars F F, which in turn are connected together by a rod, H, and lever G, and which are suspended by links $a\, a$ from the frame A of the car-bottom, all as usual.

In hangers $b\, b$, that are pivoted to the frame A, is hung the shaft I, which carries the friction-wheel J. The shaft I is free to rotate in its bearings and to vibrate toward or away from one of the axles D. In fact, the shaft I and wheel J are so located that in their normal position, unaffected by other mechanism hereinafter specified, the wheel J will drop toward a cushioned portion, $d$, of one of the axles D, so that normally the wheel J will be in contact with the said cushioned portion $d$ or with the axle itself. A chain, $e$, connects the shaft I with the upper end or part of the lever G in such manner that when the shaft I is rotated the chain $e$ will be partly wound upon it to pull the lever G, and thereby apply the brakes.

All of the parts heretofore described have been in use prior to the present invention, and are not considered as constituting any part of the invention now to be described; nor do I in this application claim the connection of one end of the shaft I by a pivoted bracket, $f$, with the frame B of the truck, which is also shown in prior patents.

L L are the draw-bars of the car. They extend underneath the entire car frame or body and carry at each end of the car a draw-head, $g$, so that they will be moved lengthwise whenever traction is applied to either end of the car. These draw-bars L L are, of course, properly guided and supported under the car, so that they may not drop out of place, and so, also, that they will be free to have longitudinal motion, but none other. The longitudinal motion of the draw-bars is limited by the guide-plates M M, that are placed under the middle of the car-body. These guide-plates M M are rigidly attached to the frame of the car-body and are parallel to the rods L L. They are slotted, as indicated in Figs. 2 and 3, and through these slots pass sliding plates $N'$ and $N^2$. A spring, $h$, is placed between the plates $N'$ and $N^2$, and serves to hold them apart and to crowd them against the pins $i'$ and $i^2$, that are attached to and project from the rods L L.

Whenever traction is applied to the draw-head in the direction of the arrow shown in Fig. 1 the pin $i'$ will draw the plate $N'$ forward and compress the spring $h$, while, when traction is applied at the other end of the car in opposite direction, the pin $i^2$ will draw the plate $N^2$ toward the plate $N'$, and also compress the spring $h$ between said two plates. Thus the single spring or cushion $h$ answers for the two draw-heads of the car, which arrangement, besides being economical and practical throughout, particularly for the purpose of the brake mechanism, is moreover advantageous, because it will tend to counteract the sagging of the car-bottom, which frequently takes place when cars are overloaded, and prevent such sagging from interfering with the proper action of the draw-head. In fact, when the draw-head is independent at each end of the car it will, when pushed inward, tend to increase the sagging of the bottom, which difficulty is entirely avoided by my arrangement through draw-bars extending from end to end and having the cushion near the center of the car. To the rods L L, or either one of them, is applied, near one of the hangers b, a projecting lip or lug, m. There is one such lug under each truck of the car, so located that the two lugs m m of each car are between the two shafts I I. When the draw-head g shown in the drawings is pulled out in the direction of the arrow in Fig. 1 for the purpose of drawing the car forward in the same direction the lip or lug m, which is shown in the drawings, will strike the hanger b in front of it, and will thereby carry the shaft I away from the axle D and prevent contact between the friction-wheel J and said axle, thus preventing the application of the brakes as long as the car is being drawn forward and moving in the same direction. As soon, however, as, by application of a brake at the rear car or by backing the locomotive, the draw-head g is drawn or pushed backward, while the car is still moving forward, the lip m shown in the drawings will thereby be moved back away from the hanger b, and will allow the friction-wheel J to come in contact with the axle, and to be consequently rotated to wind up the chain e and apply the brakes. The same result in reverse order will take place at the other truck of the same car when the direction of the motion of the car is reversed—that is to say, if the car is moved in a direction opposite to the arrow shown in the drawings, and pulled in that direction, the lip m of the other truck (not shown in the drawings) will be carried against its neighboring hanger to carry the friction-wheel J of that other truck, which is not shown in the drawings, away from its axle, and thus prevent the application of the brakes; but the pushing of the draw-head in the direction of the arrow shown in Fig. 1 while the car is yet moving in the opposite direction will cause the application of the brakes at that other truck. Thus I find that whatever the direction of the motion of the car, the brakes will not be applied as long as the car is being drawn or pushed in the direction in which it moves. Whenever its direction is intended to be reversed—in other words, whenever the draw-head is moved in a direction opposite to that in which the car moves—the brakes are immediately applied, and this result will be automatic throught the entire train.

I have not illustrated the usual hand-wheel for applying the brakes by hand, but intend to have that applied to each car in the ordinary manner, so that the brakesman at the last car of the train, when it is intended to apply the brakes, may simply apply them on the last car by hand, thereby causing the drag produced on the other cars by the last to move their respective draw-heads in a direction opposite to the actual motion of the cars, and thus automatically to apply the brakes of all the cars throughout the train.

Other advantages are connected with the use of my invention which it is unnecessary here to specify.

I have illustrated in the drawings a chain, n, which connects the free end of the shaft I with the frame of the truck. This chain is used to wind around the shaft I of the front truck whenever the car is backed; but this chain has already been shown for the same purpose in a previous patent, and is not claimed as part of the present invention.

Instead of causing the draw-bar L, as shown, to strike the hanger b positively with the lug m, a chain-connection between shaft I and rod L may be substituted; but the rigid lug is preferable, because absolute and positive in its action.

I claim—

In a railway-car, the draw-bar L, provided with lug or stop m on the inner side of hanger b, in combination with said hanger and with the shaft I, wheel J, and chain e, all arranged to allow the automatic application of the brakes by moving the stop m away from the hanger b when the car is in motion, substantially as described.

BENJAMIN F. STEWART.

Witnesses:
T. B. MOSHER,
F. V. BRIESEN.